(12) United States Patent
McHale

(10) Patent No.: US 8,200,526 B2
(45) Date of Patent: Jun. 12, 2012

(54) METHOD AND SYSTEM FOR COLLECTING STAKEHOLDER RELATIONSHIP DATA

(76) Inventor: Raymond John McHale, Woodbine (AU)

( * ) Notice: Subject to any disclaimer, the term of this patent is extended or adjusted under 35 U.S.C. 154(b) by 0 days.

(21) Appl. No.: 13/063,914

(22) PCT Filed: Jan. 15, 2010

(86) PCT No.: PCT/AU2010/000033
§ 371 (c)(1),
(2), (4) Date: Mar. 14, 2011

(87) PCT Pub. No.: WO2010/096856
PCT Pub. Date: Sep. 2, 2010

(65) Prior Publication Data
US 2011/0173049 A1    Jul. 14, 2011

(30) Foreign Application Priority Data

Feb. 26, 2009    (AU) ................................. 2009900838

(51) Int. Cl.
*G06F 17/00* (2006.01)

(52) U.S. Cl. ...................................................... 705/7.32

(58) Field of Classification Search ................... 705/7.32
See application file for complete search history.

(56) References Cited

U.S. PATENT DOCUMENTS

| | | | |
|---|---|---|---|
| 2003/0018487 A1 | 1/2003 | Young et al. | |
| 2003/0167197 A1 | 9/2003 | Shoemaker et al. | |
| 2005/0197873 A1* | 9/2005 | Little | 705/7 |
| 2008/0270205 A1 | 10/2008 | Kumar et al. | |
| 2009/0150316 A1 | 6/2009 | Peitersen et al. | |
| 2009/0234810 A1 | 9/2009 | Angell et al. | |

FOREIGN PATENT DOCUMENTS

WO    WO2007/121503 A1    11/2007

* cited by examiner

*Primary Examiner* — Thomas Dixon
(74) *Attorney, Agent, or Firm* — Kilpatrick Townsend & Stockton LLP

(57) ABSTRACT

A system for compiling and presenting data collection instruments associated with a plurality of stakeholder relationship causality models, managing data collection processes, conducting statistical tests, variable analytics and impacts calculations, and generating action plans and reports associated with a plurality of stakeholder experiences, stakeholder attitudes and stakeholder behavioral intentions for use in assessing the state of stakeholder relationships and planning for performance optimization, the system comprising: a) a user interface software module, b) a stakeholder model library, c) a variables database, d) a stakeholder profile database, e) an action plan library, f) a reports library, g) a language conversion engine, h) a stakeholder survey software module, i) a variable analytics software module, j) an impact calculation software module, k) an action plan generation software module, and l) a report generation software module.

21 Claims, 18 Drawing Sheets

Fig. 12

Impacts Calculation Module 10.39am 19/04/2009 ——— 46

| Project | Causality Model | Impact Calculation |
|---|---|---|
| Retail Banking | Mortgages | Retention - CLTV (Customer Life Time Value) |
| 21009　　102 | RB_Mort001 ——— 104 | |
| XYZ Bank | 21/09/2008 | |
| 06/08/2009 | ModVers_003a　Moddef_0002 | |

Variable Analytics Module:

|  |  |  |  | To Increase Retention by: | | |
|---|---|---|---|---|---|---|
| Standardised Beta Scores: | | Impact on Retention if Beta Score increased/reduced by 1 unit: | | 1% | 5% | 10% |
| Advocacy | 0.513 | 51.3% | Increase this variable by: | 0.02 unit | 0.1 unit | 0.2 unit |
| Satisfaction | 0.309 | 30.9% | | 0.04 unit | 0.2 unit | 0.3 unit |
| Benevolence | 0.060　120 | 6.0% | | 0.18 unit | 0.9 unit | 1.7 units |
| Commitment | 0.046 | 4.4% | | 0.25 unit | 1.2 units | 2.3 units |
| Conflict | 0.036 | 3.4% | Reduce this variable by: | 0.29 unit | 1.5 units | 2.9 units |

Customer Life Time Value: ——— 140

| | | | | | |
|---|---|---|---|---|---|
| Total number of customers | 100,000 | | 100,000 | 100,000 | 100,000 |
| Current annual customer retention rate | 85% | | 85% | 85% | 85% |
| New customer acquisition cost | $500 | | $500 | $500 | $500 |
| Gross Margin generated Year 1 (per customer) | $350 | | $350 | $350 | $350 |
| Gross Margin growth each year | 5% | | 5% | 5% | 5% |
| Number of years each customer retained | 7 | | 7 | 7 | 7 |
| Discount Rate | 15% | | 15% | 15% | 15% |
| Target annual customer retention rate | 85% | | 86% | 90% | 95% |

142　Current CLTV (per customer) = $638　　Predicted CLTV (per customer) = $670 (+5%)　$814 (+28%)　$1,031 (+62%)
　　　Current CLTV (customer base) = $63,800,000　Predicted CLTV (customer base) = $67,000,000　$81,400,000　$103,100,000

Impact Summary:

To increase annual customer retention rate by 10% and increase predicted CLTV by 62%:　144
　. Increase these variables:
　　　Advocacy by 0.2 unit; or
　　　Satisfaction by 0.3 unit; or
　　　Benevolence by 1.7 units; or
　　　Commitment by 2.3 units; or
　. Reduce this variable:
　　　Conflict by 2.9 units

METHOD AND SYSTEM FOR COLLECTING STAKEHOLDER RELATIONSHIP DATA

TECHNICAL FIELD

The present invention relates to modeling, measuring and managing stakeholder relationships. More particularly, the invention relates to the collection, analysis and reporting of data associated with a plurality of stakeholder relationship causality models in order to measure the relative strength of all manner of stakeholder relationships and component variables, predict the likely impacts of behavioural intentions on actual behaviours and organizational performance and generate and implement appropriate action plans.

BACKGROUND ART

Stakeholders are affected by and can affect an organization and must be recognized and managed accordingly. Therefore, stakeholder relationships lie at the core of an organization and may include external relationships and internal relationships. Some examples of external relationships include customers/members, shareholders, suppliers, referral sources, distribution partners, financiers, government, labour unions and the wider community. Some examples of internal relationships include employees and other workgroups, units, functional areas, departments, etc. It is understandable that the complex process of initiating, developing and maintaining stakeholder relationships in a coordinated and timely manner should be central to the relative success and sustainability of an organisation.

Many parties are vitally interested in the status and relative health of stakeholder relationships including management, shareholders, financiers, government, market analysts and others. Indeed, a review of contemporary job descriptions demonstrates that stakeholder management prowess is viewed as an important prerequisite for managers across a broad spectrum of industries. Furthermore, there is great interest in attempting to predict the behavioural intentions of stakeholder groups, with a particular focus on two groups (customers and employees) due to their direct impact on financial results. Many organisations rely on stakeholder feedback systems to monitor performance and guide improvement efforts. These typically take the form of surveys of varying quality that focus on collecting data, often to determine 'report card' or single measures such as satisfaction, engagement or advocacy. In some cases, a practice has emerged whereby surveys are comprised of a single question. While the availability of any feedback must inherently provide some benefit to those who rely on the data, total reliance on a 'report card' metric such as a satisfaction score or an advocacy score to make critical decisions unrealistically over-estimates the actionability of the data. In other words, a single 'report card' measure has little utility in guiding effective managerial action and seriously imperils decisions concerning successful and sustainable stakeholder relationship management.

Actual stakeholder behaviours, such as buying a product or service or remaining an employee of an organization, are preceded by behavioural intentions which, in turn, are the product of a combination of direct and indirect experience(s) and attitudes (intangible variables) which represent the emotional bonds between a stakeholder and an organisation. Due to the ease with which 'report card' metrics can be generated and their seductive simplicity, managers frequently ignore or misunderstand the hierarchical and differentiating characteristics of each link in the chain of effects from stakeholder experience(s) and attitudes to behavioural intentions to actual behaviours. Therefore, stakeholder relationship metrics, such as satisfaction scores or recommend intention, fail to capture the real complexity of stakeholder relationships and the predictive capability available from carefully analysing the plurality of variables associated with stakeholder experience(s) and attitudes that, in turn, influence behavioural intentions of interest to organisations.

In a practical sense, whilst it may be of assistance to know what the most important stakeholder experience(s) and attitude(s) are in driving behavioural intentions, the ability to alter each experience and attitude may differ considerably for each organisation and stakeholder group in terms of relevance, practicality and cost. Furthermore, managers would appreciate some guidance as to the expected change in behavioural intentions and actual behaviours which will result from a proposed investment or activity to change a single or set of stakeholder experiences and attitudes.

It is an object of the present invention to overcome the shortcomings and disadvantages of existing methods, systems, and practices associated with the use of 'report card' metrics such as satisfaction scores and advocacy scores and to provide an improved framework, method, system and manner of manufacture for stakeholder relationship data collection, analysis and measurement which is capable of taking data and making projections about expected changes in behavioural intentions and actual behaviours should certain stakeholder experiences and attitudes, as identified by research (McHale 2004), be modified.

DISCLOSURE OF INVENTION

In accordance with the teachings of the present invention, a framework, method, computer-implemented system and manner of manufacture is provided for capturing data associated with and measuring a plurality of predefined and interrelated latent variables representing stakeholder experiences, stakeholder attitudes and stakeholder behavioural intentions which are collectively incorporated in a plurality of stakeholder relationship causality models representing all manner of stakeholder relationship types and settings, based on these measurements predicting the outcomes of actual behaviours and associated impacts on organizational performance and generating relevant reports and action plans to give effect to desired performance improvement outcomes.

According to a first aspect of the invention, there is provided a framework for representing the hierarchy, flow and chain of effects associated with a plurality of stakeholder experiences, stakeholder attitudes and stakeholder behavioural intentions and their linkage to actual stakeholder behaviours and organisational performance, the framework comprising a plurality of latent experiential variables, a plurality of latent attitudinal variables, a plurality of latent behavioural intention variables, a plurality of actual behaviours and organizational performance.

According to a second aspect of the invention, there is provided a method of modeling and measuring phenomena associated with a plurality of stakeholder experiences, stakeholder attitudes and stakeholder behavioural intentions for use in assessing the state of all manner of stakeholder relationships and planning for performance optimisation, the method comprising identifying and depicting a plurality of latent variables, identifying and depicting direct and indirect causal processes between the latent variables, completing statistical testing on collected data, calculating 'Strength of Relationship Index' score and 'Outcomes' score and identifying specific latent variables likely to have the largest positive impact on stakeholders' behavioural intentions, actual behaviours and associated organizational performance.

According to a third aspect of the invention, there is provided a system for compiling and presenting data collection instruments associated with a plurality of stakeholder relationship causality models, managing data collection processes, conducting statistical tests, variable analytics and impacts calculations, and generating action plans and reports associated with a plurality of stakeholder experiences, stakeholder attitudes and stakeholder behavioural intentions for use in assessing the state of all manner of stakeholder relationships and planning for performance optimisation, the system comprising a user interface software module, a stakeholder model library, a variables database, a stakeholder profile database, a action plan library, a reports library, a language conversion engine, a stakeholder survey software module, a variable analytics software module, a impacts calculation software module, a action plan generation software module and a report generation software module.

According to a fourth aspect of the invention, there is provided a method for assessing the state of all manner of stakeholder relationships and planning for performance optimisation, the method comprising generating and collecting appropriate data, inputting collected data, generating output data, calculating impacts and generating output data, and generating appropriate action plans.

According to a fifth aspect of the invention, there is provided a system for assessing the state of all manner of stakeholder relationships and planning for performance optimisation, the system comprising a stakeholder survey software module, a variable analytics software module, a impacts calculation software module and a action plan generation software module.

BRIEF DESCRIPTION OF DRAWINGS

Embodiments of the present invention are now described by way of an example with reference to the accompanying drawings, in which:

FIG. 12 depicts an example of a report illustrating the data results generated by the impacts calculation software module.

BEST MODE FOR CARRYING OUT THE INVENTION

Embodiments of the present invention will be described in more detail with reference to a specific implementation relating to customer stakeholders.

It will be appreciated that the present invention may be used in conjunction with existing techniques and software tools to further enhance the data collection, statistical analysis and reporting functions. Variations and additions are expected with different implementations of the present invention, but which utilise the general inventive concepts thereof.

Stakeholder relationship analysis and assessment focuses on understanding the relationships between organisations and the plurality of stakeholders who are important to the organisation's future success and sustainability. In the absence of monopolistic market conditions, customer stakeholders are normally able to choose between competing organisations that best meet their immediate and future needs and rely upon a mixture of experiential and attitudinal factors when doing so. Accordingly, the bases upon which such choices are made require organisations to formulate and execute strategies that are designed to influence stakeholders' behavioural intentions and subsequent actual behaviours in order to optimise organisational performance.

The identification of key latent variables that influence customers' behavioural intentions, the relative importance of these variables to behavioural intentions and the tracking of the relative performance of the organisation on these key variables allows the organisation to allocate resources to targeted areas where return on investment can be maximised.

The present invention utilizes a plurality of novel stakeholder relationship causality models, each consisting of a plurality of latent variables reflecting the nature and context of the relationships to be assessed, and a novel modular software system in order to ascertain the impacts between manifest variables and latent variables and the impacts between latent variables, the likely impacts between behavioural intentions and actual behaviours and to compile appropriate action plans designed to enhance organizational performance.

Figure 1:
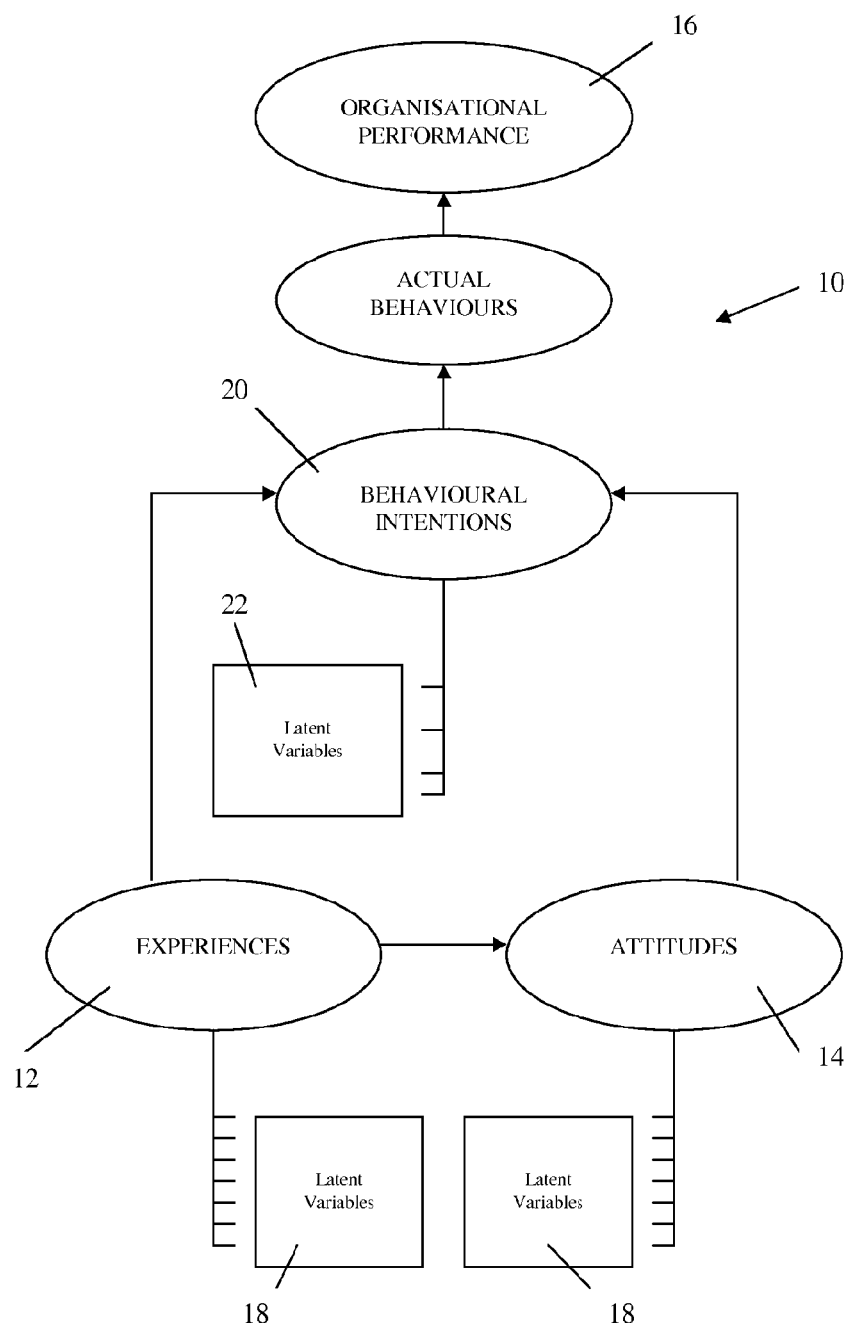
FIG. 1 illustrates the postulated framework for representing the hierarchy, flow and linkages within stakeholder relationships in accordance with an embodiment of the invention.

Customers' actual behaviours (such as remaining a customer, repeatedly buying goods and services and positively or negatively advocating the organisation to other parties) are preceded by their behavioural intentions and these, in turn, are directly influenced by a combination of their experiences and attitudes. Customer experiences also influence their attitudes. With reference to FIG. 1, there is shown the postulated framework 10 for representing the hierarchy, flow and chain of effects within stakeholder relationships as embodied in one aspect of the present invention. The postulated framework 10 applies to all manner of stakeholder relationships and to the plurality of stakeholder relationship causality models embodied in the present invention and indicates the ongoing linkage between experiences 12 and attitudes 14 and behavioural intentions 20 and organizational performance 16.

Figure 2:
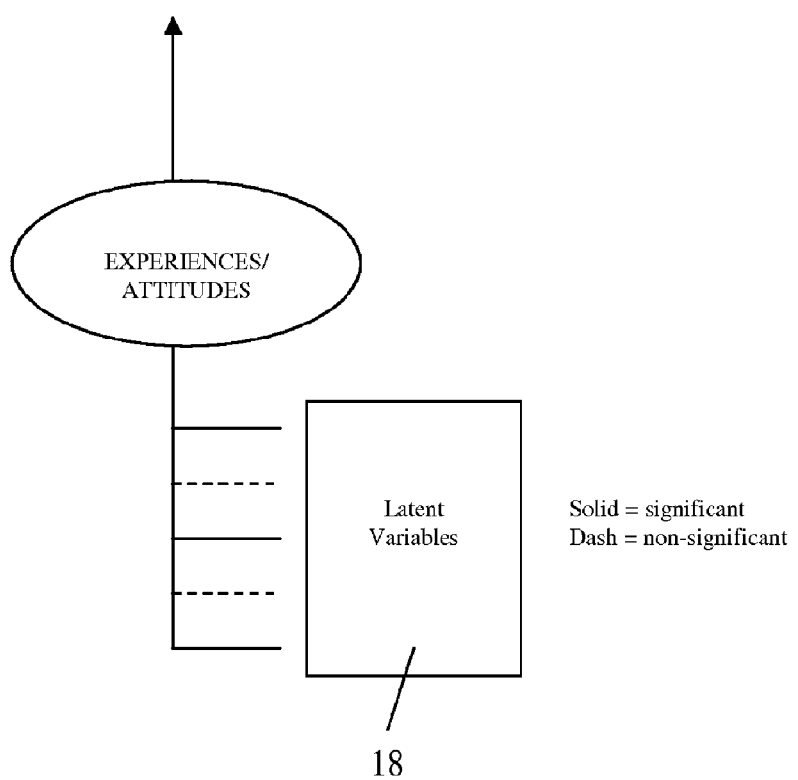
FIG. 2 illustrates the relative importance of a plurality of experiential and attitudinal latent variables.

The experiences dimension of the framework 12 is comprised of a plurality of latent variables 18, some relatively more significant than others (refer to FIG. 2), that are considered by the customer(s) as important in determining their behavioural intentions 20, represented by a plurality of latent variables 22, based on their direct personal experiences or the experiences of trusted others (e.g. friends, family, colleagues, highly regarded individuals) who may positively or negatively recommend the organisation and its goods and services (often described in the literature as 'word of mouth'). These performance based variables are often characterised as rational variables and may include but are not limited to service, quality, convenience and price.

The attitudes dimension of the framework 14 is comprised of a plurality of latent variables 18, some relatively more significant than others (refer to FIG. 2), that are considered by the customer(s) as important in determining their behavioural intentions 20, represented by a plurality of latent variables 22. While these variables are also influenced by actual experiences, they are characterised as intangible and emotion-based variables that form the basis for potentially very strong bonds between the customer and the organisation. Specific attitudinal latent variables 18 can have both direct and indirect influences on customers' behavioural intentions 20. For example, attitudinal variable A can directly influence the customer's behavioural intention B and also influence attitudinal variable G but not attitudinal variables C and K. In other words, attitudinal latent variables 18 tend to exhibit a significantly greater level of complexity and interrelatedness in explaining their influence on customers' behavioural intentions 20 than do the experiential latent variables 18.

Figure 3A:
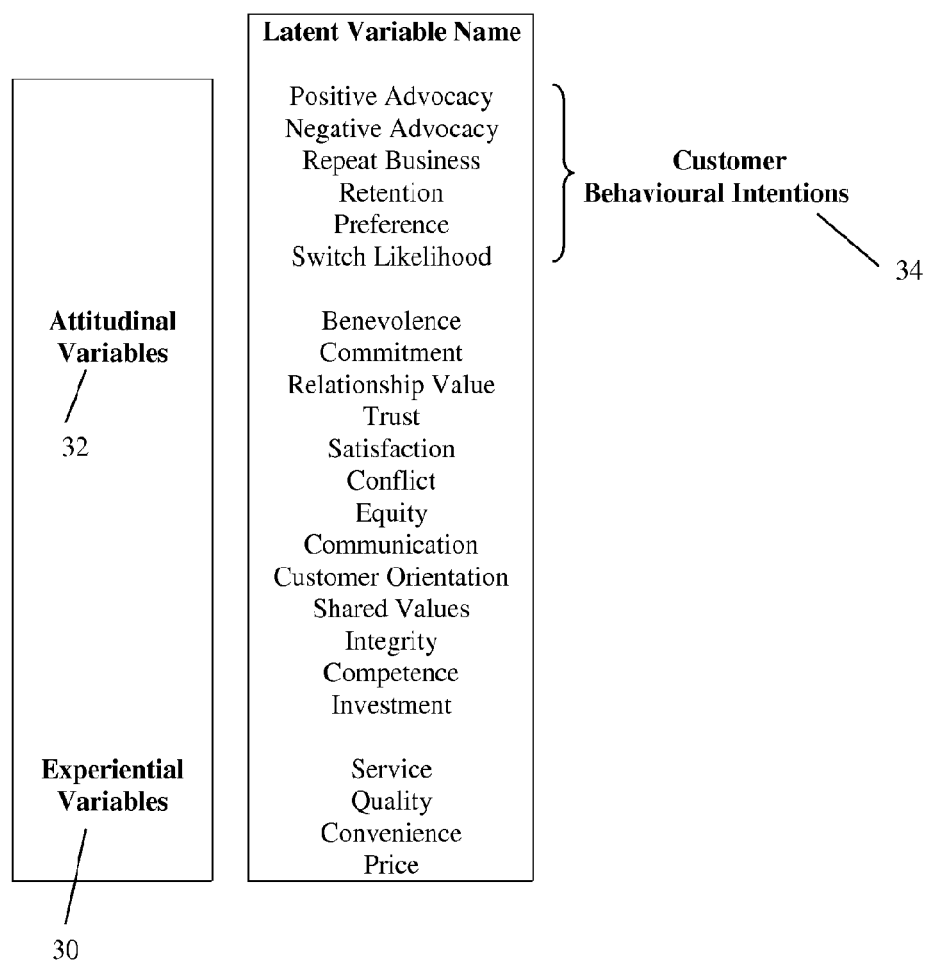
FIG. 3a illustrates an example of one high level causal model of customer stakeholder relationship latent variables in accordance with an embodiment of the invention.

This invention incorporates a plurality of novel stakeholder relationship causality models (each comprised of a plurality of dependent and independent latent variables representing stakeholder experiences 12, attitudes 14 and behavioural intentions 20) to reflect the specific context and nature of relationships between discrete stakeholder groups and an organisation. Such stakeholder groups may be characterized as either external or internal. With reference to FIG. 3*a*, there is shown a high level representation of one of the customer stakeholder causality models which reflects the identified experiential 30 and attitudinal 32 variables associated with customer behavioural intentions 34.

Figure 3B:
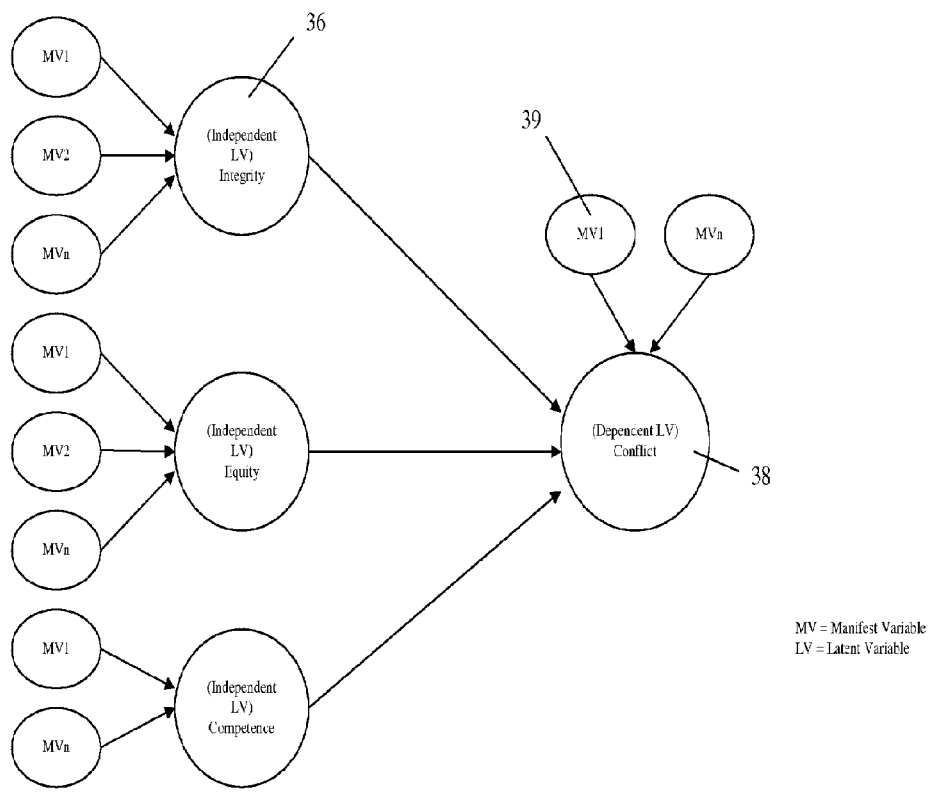
FIG. 3b illustrates a detailed section of a causal model of customer stakeholder relationship variables in accordance with an embodiment of the invention.

With reference to FIG. 3*b*, there is shown a subsection of the same customer stakeholder causality model depicting the specific direct linkages between some of the identified independent latent variables 36 (integrity, equity and competence) and a single dependent latent variable 38 (conflict). Each of the independent and dependent variables is measured using at least one manifest variable 39 but typically using a plurality of manifest variables. It is to be noted that each stakeholder relationship causality model (including the customer stakeholder example) contains a series of sub models that, when taken in their totality, represent the whole stakeholder relationship causality model. Independent latent variables may have direct and/or indirect linkages to one or more dependent latent variables. Dependent latent variables may, in some instances, become independent latent variables. In each case, it is possible to predict hypothetical shifts in specific behavioural intentions 20 by reference to the performances of specific experiential 12 and attitudinal 14 variables. From these hypothetical shifts, it is then possible to estimate the extent of changes needed to get them to the best position consistent with achieving improved organisational outcomes such as customer retention and increased market share through advocacy.

Figure 4:
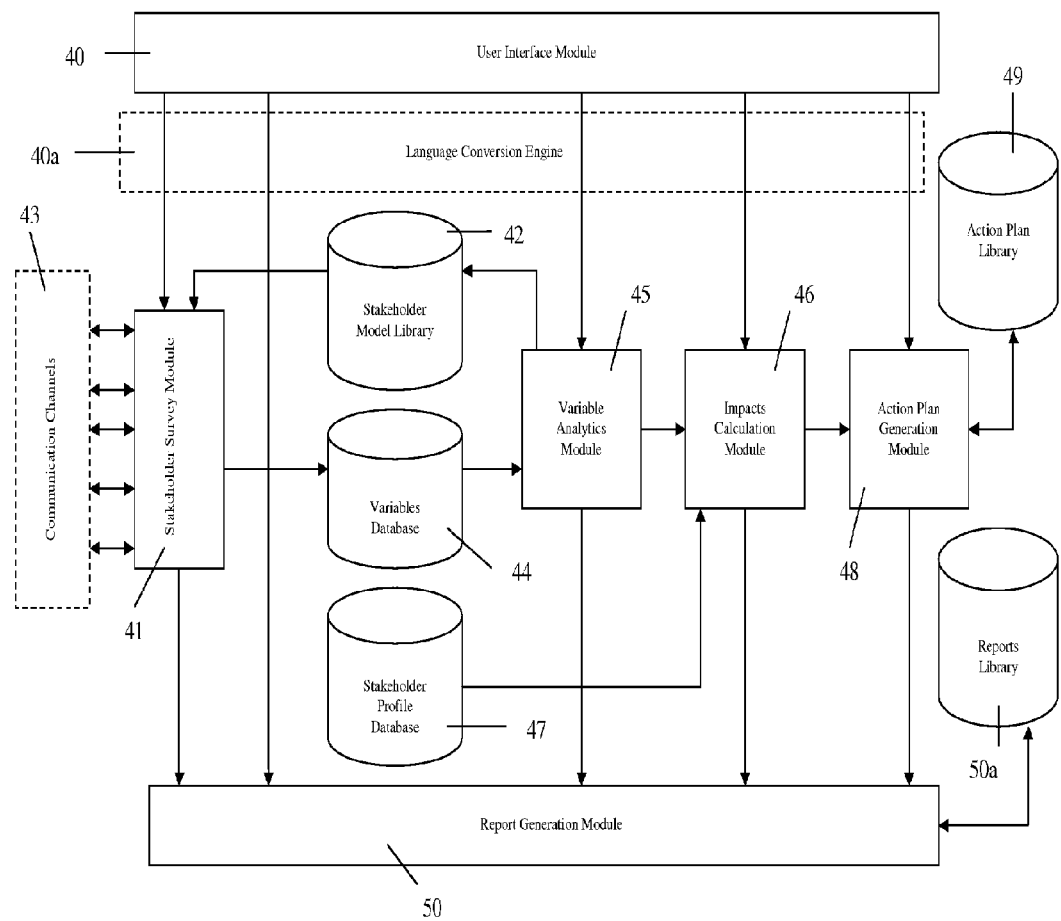
FIG. 4 is a software block diagram illustrating the top level software modules for performing the user interface, language conversion, data collection, analytics, diagnostics, action planning and reporting functions associated with stakeholder relationships.

With reference to FIG. 4, there is shown the top level software modules of the present invention for performing the user interface, language conversion, survey formulation and presentation, data collection, analytics, impact diagnostics, action plan generation and reporting functions. In essence, the software modules allow the user to interface with and control other modules, prepare and present stakeholder surveys in an appropriate language, collect data and process stakeholder case data in order to measure stakeholder relationships, determine behavioural intentions and their likely impacts upon actual behaviours and organizational performance, generate appropriate action plans for improved performance and produce and present reports and dashboards in an appropriate language.

The user interface module 40 is connected to and is utilized for accessing and controlling all other software modules and system functions of the present invention.

A survey software module 41 that is utilized for formulating and presenting, in an appropriate language chosen via the language conversion engine 40*a*, relevant survey content to potential respondents from predetermined stakeholder groups and collecting data associated with a set of predetermined manifest and latent variables and respondent characteristics. Stakeholder surveys typically ask each stakeholder to indicate on a Likert scale from 1-7 their levels of agreement with statements relative to certain relationship attributes which represent predetermined latent variables, together with multiple choice questions relating to stakeholder characteristics. In the preferred embodiment, the survey module 41 is linked to the stakeholder model library 42 and utilizes the manifest and latent variables (and associated wordings) assigned to the specific causality model(s) relevant to the intended stakeholder group. Within this embodiment, stakeholder surveys are distributed to and data is collected from stakeholders via the most appropriate available communication channel(s) 43 (e.g. internet, kiosk, telephone, hardcopy) and the resulting data output, including respondent characteristics, is date and time stamped and stored in the variables database 44 following completion of preliminary analyses.

A variable analytics software module 45 uses the stakeholder survey module 41 case data and stakeholder relationship causality model specification to complete various statistical analyses and produce descriptive statistics and latent variable related data outputs. Within this module scores are calculated for each of the latent variables indicating a standard score representing perceived level of performance, typically between 0 and 100. A 'Strength of Relationship Index' score is calculated using an algorithm that sums the positive latent variables representing stakeholder experiences 12 and attitudes 14 (excluding stakeholder behavioural intentions 20) before deducting the negative latent variables representing stakeholder experiences 12 and attitudes 14. A 'Outcomes' score is also calculated using an algorithm that sums the positive latent variables representing valued stakeholder behavioural intentions 20 before deducting negative latent variables representing behavioural intentions 20. In the preferred embodiment, data output from this software module is utilized for three purposes; firstly, calculating the predicted impacts of behavioural intentions 20 on organizational performance 16 (via the impacts calculation software module 46), secondly, generating relevant reports describing statistical outputs and calculated scores and, thirdly, for incrementally updating and modifying, as required, the predetermined stakeholder causality models stored in the stakeholder model library 42 for future use.

The impacts calculation software module 46 utilizes the data generated by the variable analytics module 45 (such as the scores for individual latent variables representing behavioural intentions 20, linked latent variable drivers and their standardized coefficients), together with data extracted from the stakeholder profile database 47, to calculate the predicted impacts of behavioural intentions 20 on organizational performance 16. Examples of data extracted from the stakeholder profile database 47 may include, without limitation, a customer segment descriptor, current annual customer retention rate, average cost to acquire a new customer, average customer profit, expected annual profit margin growth, a discount (hurdle) rate, the current total number of customers and target annual customer retention rate.

The action plan generation software module 48 utilizes the data generated by the impacts calculation module 46 to automatically generate action plan descriptions from the linked action plan library database 49. Selected action plans are based on the identification of the specific latent variable drivers demonstrating the largest Beta values (standardized coefficients) in terms of their estimated impact on behavioural intentions 20. The suggested action plans may be interim in nature and form the basis for more detailed, contextual and nuanced action plans utilizing additional information exogenous to the invention but nonetheless specific to the organisation's operating environment and strategic intent. The action plan library 49 is continuously updated with new versions of action plans that can be utilized with future uses of the method and system.

The report generation software module 50 utilizes the data generated by the stakeholder survey 41, user interface 40, variable analytics 45, impacts calculation 46 and action plan generation 48 software modules to generate from the reports library 50*a* a range of predetermined reports and dashboards specific to the inputs and outputs of the method and system.

The present invention provides diagnostic rules relating to each software module to assist the user to detect conditions which indicate the breach of predetermined tolerances and this is achieved by generating diagnostic outputs for each software module via the report generation module 50.

Figure 5A:
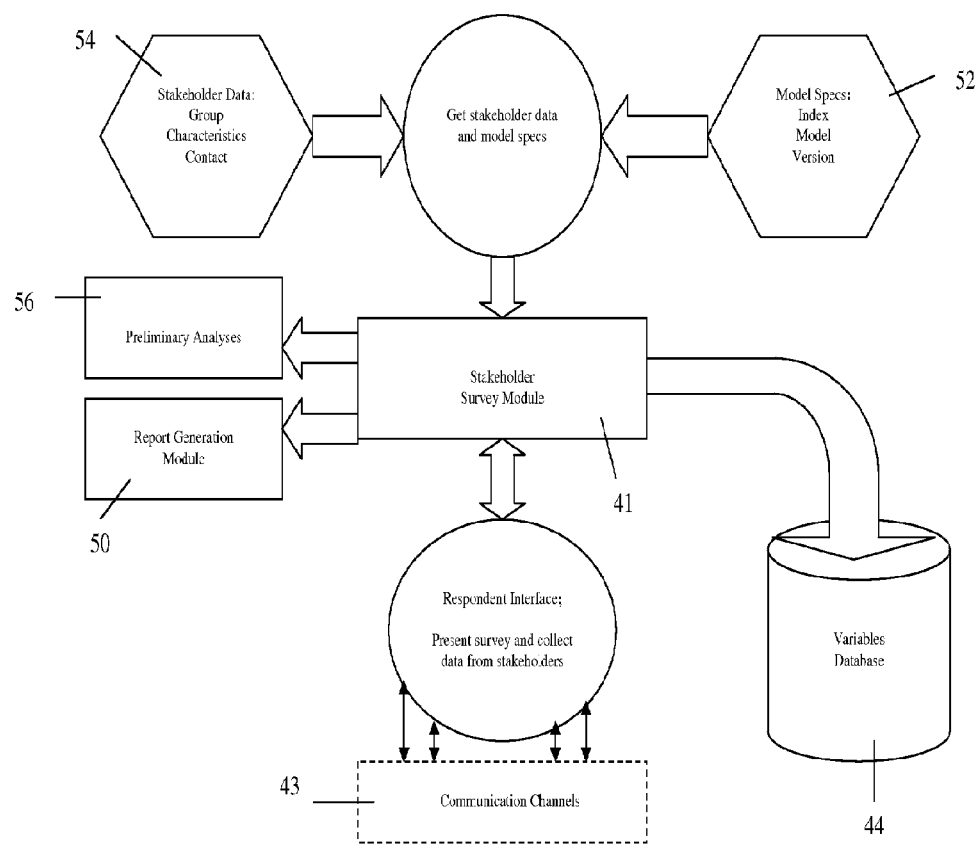
FIG. 5a is a software block diagram illustrating the data flow and methods for the stakeholder survey software module.

FIG. 5*a* depicts the software implementation of the preferred embodiment for the stakeholder survey software module 41. The stakeholder survey module 41 obtains the required stakeholder relationship causality model specifications 52 and stakeholder data 54. In each instance, the stakeholder relationship causality model specifications 52 define the variables to be measured and the relationship between manifest variables and linked latent variables and between the latent variables in the model. After the stakeholder survey software module 41 has acquired the appropriate stakeholder data 54 and stakeholder relationship causality model specifications 52, the content is reviewed and manually modified (as required) by the user to finalise. The stakeholder survey software module 41 may utilize all manner of methods to communicate with selected stakeholders and distribute the survey via appropriate communication channels 43. At a predetermined date and time or earlier when the predetermined number and/or type of survey responses has been captured, the survey software module 41 retrieves the recorded survey data, date and time stamps the data, and undertakes preliminary analyses 56 such as screening and cleaning, extracting descriptive statistics, exploring the data, manipulating the data and checking the reliability of any scales associated with manifest and latent variables. In the preferred embodiment it is recognized that manual intervention may be required by a suitably skilled and trained person to complete the preliminary analyses 56. At the conclusion of the preliminary analyses 56, survey case data is stored in the variables database 44 and relevant reports are produced by the report generation software module 50. The present invention continuously adds historical survey case data to the variables database for future use by the method and system.

Figure 5B:
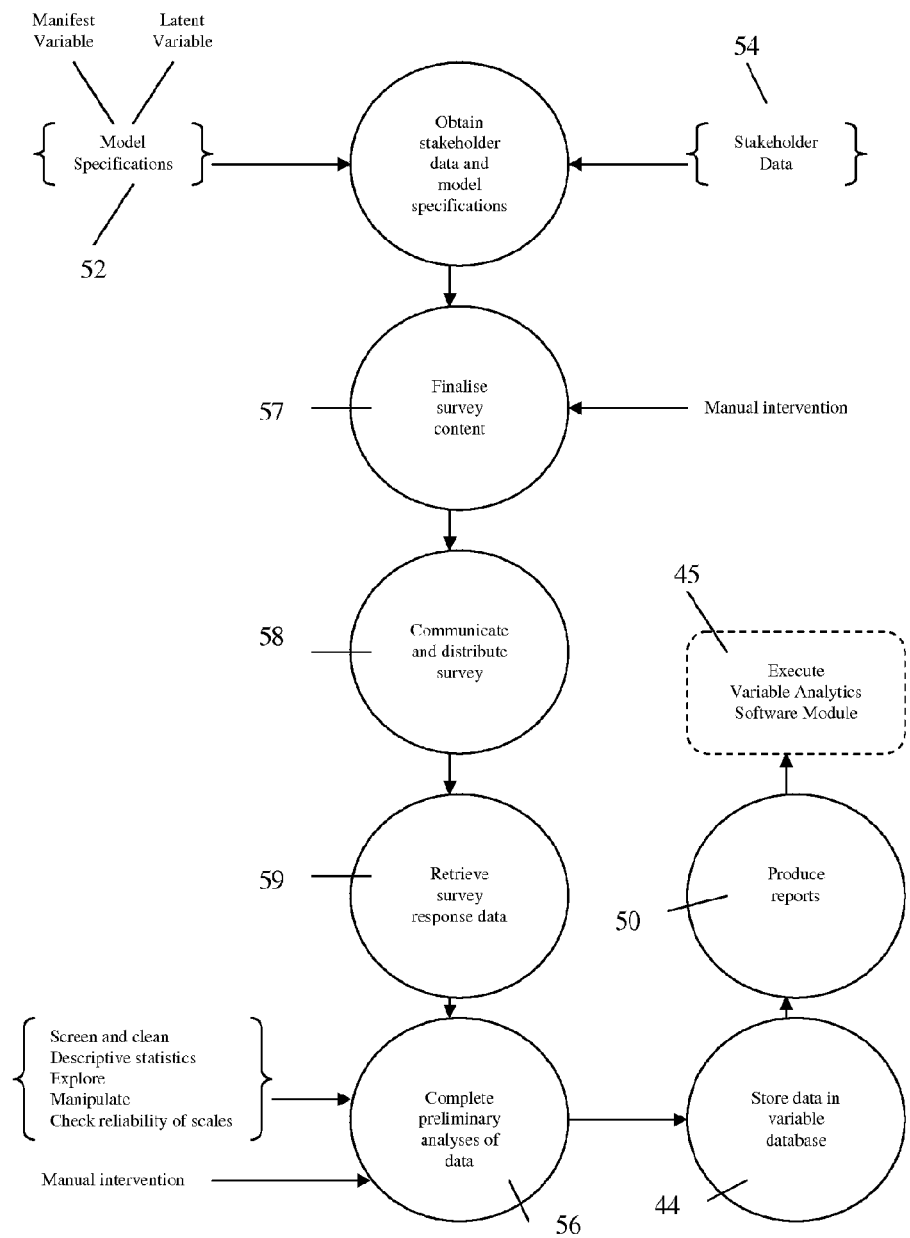
FIG. 5b is a process flowchart depicting the operations performed by the stakeholder survey software module.

FIG. 5*b* shows the processing steps for the stakeholder survey software module 41. The stakeholder survey module 41 executes the survey content aggregation function in order to retrieve particular stakeholder data 54 and the stakeholder relationship causality model specifications 52 based upon predetermined criteria. For example, the predetermined criteria may include retrieving stakeholder data and linked model specifications associated with customers with a mortgage and who reside within a particular area. Based upon that criteria, the stakeholder data 54 and the relevant stakeholder relationship causality model specifications 52 are retrieved and form the basis of the proposed survey content. The survey content is finalized 57, using manual intervention if required, and placed in a queue in preparation for communication and distribution 58 to identified stakeholders via the preferred communication channel(s) 43.

The stakeholder survey module 41 performs a communication and distribution function 58 at a predetermined date and time by utilizing some of the stakeholder data 54 to determine the most appropriate communication channel 43 and contact details. For example, some stakeholders may receive an email with an embedded link to an online survey accessible through the internet, while others may receive an SMS with details of a phone number to contact and still others receive a phone call or a hardcopy of the survey for completion and return in the mail.

The survey response data retrieval function 59 retrieves stakeholder survey response data from a centralized data file that has been populated with data collected across various communication channels before completing a series of preliminary analyses 56. A preliminary analyses function 56 examines the raw stakeholder survey response data and determines any actions that may be required to statistically adjust the stakeholder response data prior to storing the data in the variables database 44. The preliminary analyses function 56 is described in the following reference: J. Pallant (2001) SPSS Survival Manual, Allen & Unwin, Australia, pp. 36-87. After the preliminary analyses function 56 has been completed, with the possibility of some manual intervention, and the resulting data are stored in the variables database 44, predetermined reports are produced by the report generation module 50 for the user to review to ensure the data results are within predetermined tolerances. The user may proceed to execute the variable analytics module 45. If the user wishes to continue execution, the variable analytics module 45 utilizes the case data stored in the variables database 44 in order to analyse the data and produce latent variable related data outputs and scores representing perceived level of performance, typically between 0 and 100. The present invention provides for full automation of the analytics 45, impacts 46, action plan generation 48 and report generation 50 modules by allowing the complete execution of the variable analytics module 45, the impacts calculation module 46, the action plan generation module 48 and the report generation module 50 before returning control back to the user. Therefore, the present invention is not limited to a user viewing the results after execution of each module with the exception of the stakeholder survey module 41 which has been described above.

Figure 6A:
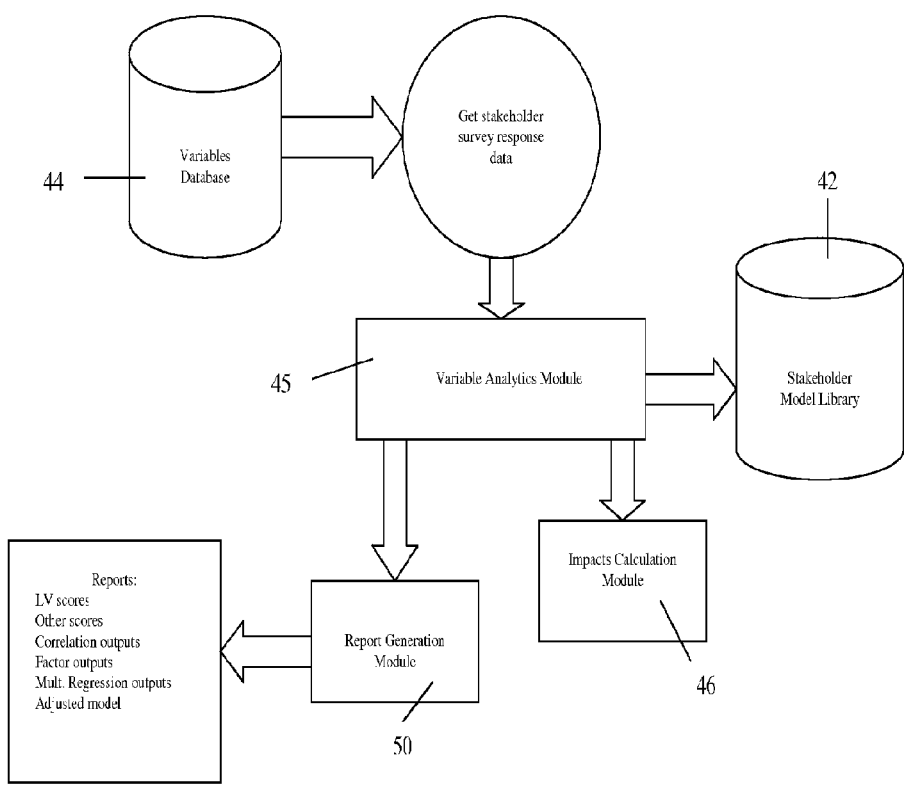
FIG. 6a is a software block diagram illustrating the data flow and methods for the variable analytics software module.

FIG. 6a depicts the software implementation of the preferred embodiment for the variable analytics module 45. The variable analytics module 45 obtains the required stakeholder survey response data from the variables database 44. In each instance, the response data has already been prepared in the stakeholder survey module 41 to ensure it is in a state that supports statistical analysis. After obtaining the appropriate stakeholder survey response data, the variable analytics module 45 utilizes various statistical analysis techniques to derive latent variable related data outputs based on the specific stakeholder relationship causality model 52 initially used to define the stakeholder survey. Specifically, but not exclusively, correlation analysis, factor analysis (if required) and multiple regression analysis techniques are applied to the data to test and determine the relationships between manifest variables and the associated latent variables and amongst the latent variables as per the specific stakeholder relationship causality model 52. The statistical analysis techniques are generally described in the following reference: J. Pallant (2001), SPSS Survival Manual, Allen & Unwin, Crows Nest, pp. 115-167.

Stakeholder survey response data is used to derive the mean measure of the appropriate latent variables and to derive the appropriate associated impacts represented by Beta (standardized coefficient) values. Within the variable analytics module 45 scores are calculated for each of the latent variables indicating a standard score representing perceived level of performance, typically between 0 and 100. A 'Strength of Relationship Index' score is calculated for the latent variables representing stakeholder experiences 12 and attitudes 14 (excluding stakeholder behavioural intentions 20) predefined in the specific stakeholder relationship causality model 52 and a further 'Outcomes' score is calculated for the latent variables representing stakeholder behavioural intentions 20 defined in the same causality model. In the preferred embodiment, data output from this module is utilized, firstly, as input to the report generation module 50, secondly, as input to the impacts calculation module 46 which calculates the predicted impacts of behavioural intentions 20 on organizational performance 16 and, thirdly, for updating and redefining, as required, the existing stakeholder relationship causality models 52 stored in the stakeholder model library 42. A predetermined set of reports is produced within the report generation module 50 using the output from the variable analytics module 45 for the user to review.

Figure 6B:
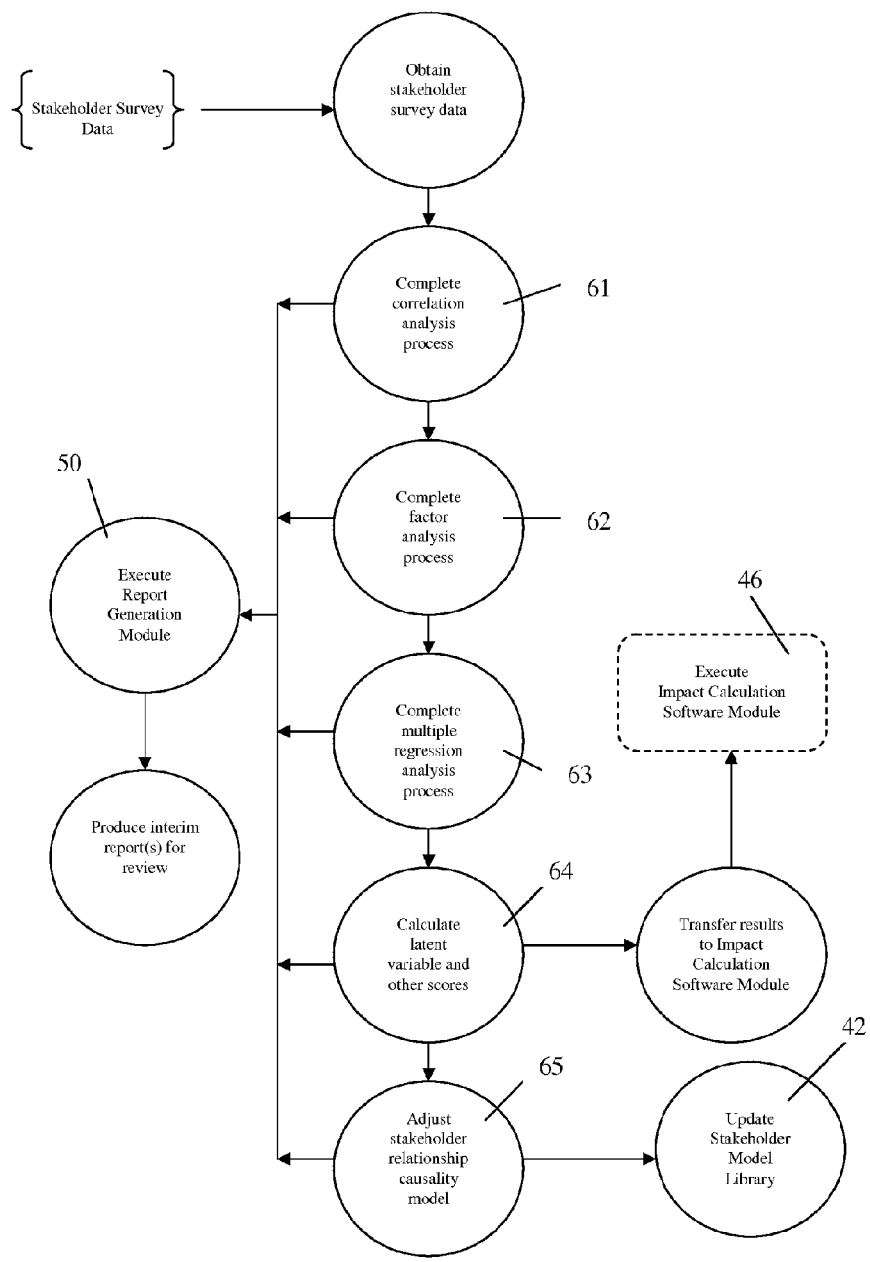
FIG. 6b is a process flowchart depicting the operations performed by the variable analytics software module.

FIG. 6b shows the processing steps for the variable analytics software module 45. The variable analytics module 45 retrieves particular stakeholder survey data. The appropriate stakeholder survey data are retrieved for the purpose of undertaking various statistical analysis techniques.

Firstly, the variable analytics module 45 performs a correlation analysis process 61 to determine the strength and direction of the linear relationships between pairs of variables posited as having linear relationships in the specific stakeholder relationship causality model 52 linked to the stakeholder survey data. The Pearson product-moment coefficient (r) is utilized as the data relates to interval level (continuous) variables. At the conclusion of this process, the variable analytics module 45 automatically produces reports 50 for the user to review. The review may comprise a number of recommended steps such as checking information about the sample, determining the direction and strength of the relationship to compare against the linked stakeholder relationship causality model 52, and checking the coefficient of determination ($r^2$) to determine how much variance each pair of variables share.

Secondly, where one or more of the latent variables is comprised of a number of scale items, the sample data is of sufficient size and correlation coefficients are present at a minimum level, the variable analytics module 45 performs a confirmatory factor analysis process 62 to determine if it is possible to reduce the number of scale items associated with each latent variable to best represent the inter-relations among the set of variables. At the conclusion of this process, the variable analytics module 45 automatically produces reports 50 for the user to review.

Next, the variable analytics module 45 performs a multiple regression analysis process 63 which is comprised of a family of techniques that can be used to explore the relationship between a single continuous dependent variable and a number of independent variables or predictors. The relationships subject to examination are those defined in the specific stakeholder relationship causality model 52 utilized to collect the stakeholder survey data. For example, the drivers of customers' behavioural intentions 20 can be identified through multiple regression analysis. The result of the regression is an equation that represents the best prediction of a dependent variable and several continuous independent variables (Tabachnick & Fidell, 2007, p. 118). The resulting equation from the regression analysis is illustrated below:

$$Y'=A+B_1X_1+B_2X_2+\ldots+B_kK_k$$

where Y' is the predicted value on the dependent variable, A is the Y intercept (the value of Y when all the X values are zero), the Xs represent the various independent variables (of which there are k variables), and the Bs are the coefficients assigned to each of the independent variables during regression. Although the same intercept and coefficients are used to predict the values on the dependent variable for all cases in the sample, a different Y' value is predicted for each subject as a result of inserting the subject's own X values into the equation.

The goal of regression is to arrive at the set of Beta values (also called regression coefficients) for the independent variables that best predicts the Y' values. Both the unstandardised and standardized Beta are obtained. The degree to which all the independent variables have in predicting the outcome of the dependent variable can be derived from the Pearson product-moment correlation coefficient, more commonly known as $R^2$. It is preferred that the approach also sets stringent conditions for minimum $R^2$ values and multicollinearity. For instance, in order for a regression solution to be accepted, the model is required to have a minimum $R^2$ value of 70% and to be cleared of any multicollinearity issues.

Within the variable analytics module 45, a separate regression analysis is performed for each component of the defined stakeholder relationship causality model 52. The regression analysis performed for each component of the model allows for the identification of significant variables that ultimately drive customers' behavioural intentions 20. For example, the linear regression performed on the experiential and attitudinal variables 18 identifies the subset of variables that contribute most to the prediction of customers' behavioural intentions 20 such as repeat business and advocacy and therefore are likely to have the most significant impact on actual behaviours and organizational performance 16. At the conclusion of this process, the variable analytics software module 45 automatically produces reports 50 for the user to review and interpret.

Next, the variable analytics module 45 calculates the scores for each latent variable expressed as a score between 0 and 100, together with a 'Strength of Relationship Index' score and a 'Outcomes' score, both expressed as a score between 0 and 100, and automatically produces reports 50 for the user to review. The calculated scores are retained and transferred to the impact calculation software module 46.

As a result of completing the preceding statistical analysis processes, it is possible to compare and contrast the results achieved against the relationships defined by the specific stakeholder relationship causality model 52 to determine if the stakeholder survey data is more closely described by an alternative stakeholder relationship causality model. The variable analytics module 45 automatically completes the comparison and, if appropriate, generates an amended stakeholder relationship causality model 65 and updates the stakeholder model library 42 accordingly. Again, the variable analytics module 45 automatically produces reports 50 for the user to review if an amended model has been generated.

All reports generated by the report generation module 50, using the output from the variable analytics module 45, are retained for future reference and use in the reports library 50a.

Figure 7A:
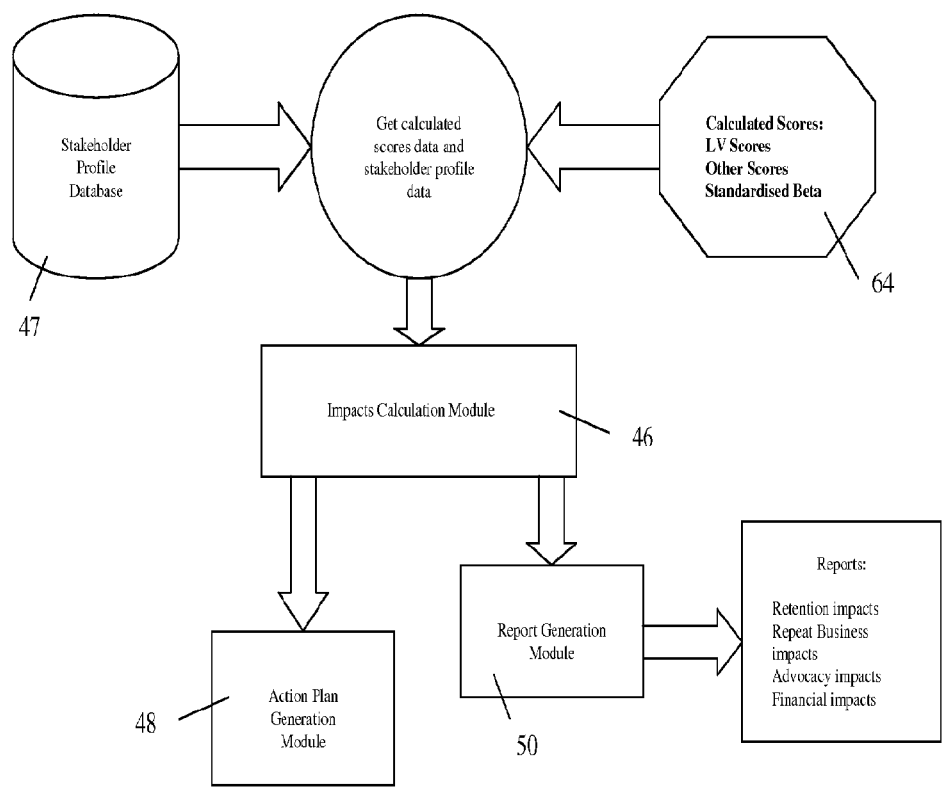
FIG. 7a is a software block diagram illustrating the data flow and methods for the impacts calculation software module.

FIG. 7a depicts the software implementation of the preferred embodiment for the impacts calculation software module 46. The relative performance or impact each latent variable has on customers' behavioural intentions 20 can be determined from the standardized Beta scores that are obtained from each of the multiple regression analyses 63. The standardized Beta scores are used to calculate the relative impact of each latent variable within the interrelationships defined in each stakeholder relationship causality model 52. Consequently, the relative impact of each experiential and attitudinal variable 18 on behavioural intentions 20 such as retention, repeat business and advocacy can be determined discretely. Further, hypothetical shifts in customers' behavioural intentions 20 are possible by changing the performance of significant experiential and/or attitudinal variables 18 that are found to be driving intentions and the predicted financial or other organizational impacts then calculated.

In the preferred embodiment, the impacts calculation module 46 obtains the calculated scores 64 (individual latent variable scores, 'Strength of Relationship Index' score and 'Outcomes' score) and related standardized Beta scores from the variable analytics module 45 together with appropriate stakeholder profile data from the stakeholder profile database 47. This data is utilized to complete the impacts calculations associated with customers' behavioural intentions 20 (retention, repeat business and advocacy) and calculate the financial impacts. A predetermined set of reports is produced by the reports generation module 50 for the user to review.

After retrieving the appropriate stakeholder profile data 47 and calculated scores 64, the impacts calculation module 46 combines the data to calculate 'what if' impacts on customers' behavioural intentions 20 and predicted financial performance. For example, by using the standardized Beta scores for each of the independent latent variables in the stakeholder relationship causality model 52 linked to the customers' behavioural intention 'retention' 22, it is possible to calculate what the impact on 'retention' would be if each of the independent latent variable scores were increased/reduced by 1 unit. For instance, a standardized Beta score of 0.377 for the independent latent variable 'satisfaction' can be interpreted as predicting that the behavioural intention of 'retention' will improve by almost 38% if 'satisfaction' was increased by 1 unit. The resulting impact calculations can be utilized by the impacts calculation module 46 to calculate the predicted effect on financial performance metrics such as customer life time value (CLTV) and the increase/decrease in the overall value of the organisation's customer base. Calculated impacts of independent latent variables on linked dependent variables, as per the specific stakeholder relationship causality model 52 utilized, form the basis for later identifying and generating appropriate action plans designed to maximize organizational performance 16.

Within this invention the impacts calculation module 46 is also utilized to predict the impacts on the 'Strength of Relationship Index' and 'Outcomes' scores of hypothetical shifts in the performance of specific independent and dependent latent variables and what this may mean in terms of benchmarking performance against other organizations, industries or other appropriate benchmarking units of measure such as peer internal workgroups and asset portfolios.

In the preferred embodiment, data output from this software module is utilized, firstly, as input to the report generation module 50 and, secondly, as input to the action plan generation module 48 which identifies and generates appropriate action plans.

Figure 7B:
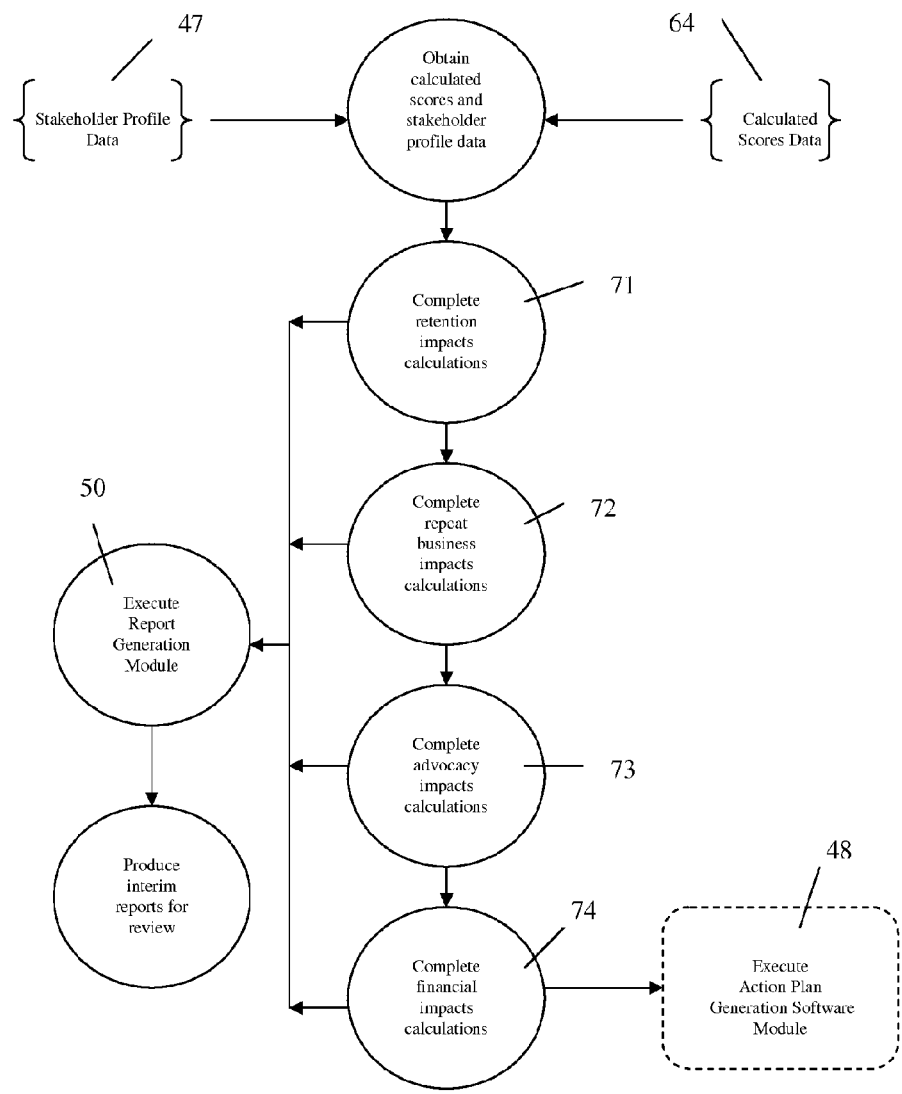
FIG. 7b is a process flowchart depicting the operations performed by the impacts calculation software module.

FIG. 7b shows the processing steps for the impacts calculation software module 46. The impacts calculation module 46 retrieves the calculated scores 64 and particular stakeholder profile data 47. The appropriate data are retrieved for the purpose of undertaking various impact calculations associated with specific behavioural intentions 20 and predicted financial or other organizational performance 16 measures.

Impact calculations are executed for each of the behavioural intentions 20 of retention 71, repeat business 72 and advocacy 73, together with the associated financial impacts 74. Reports are produced via the report generation module 50 for the user to review.

Figure 8A:
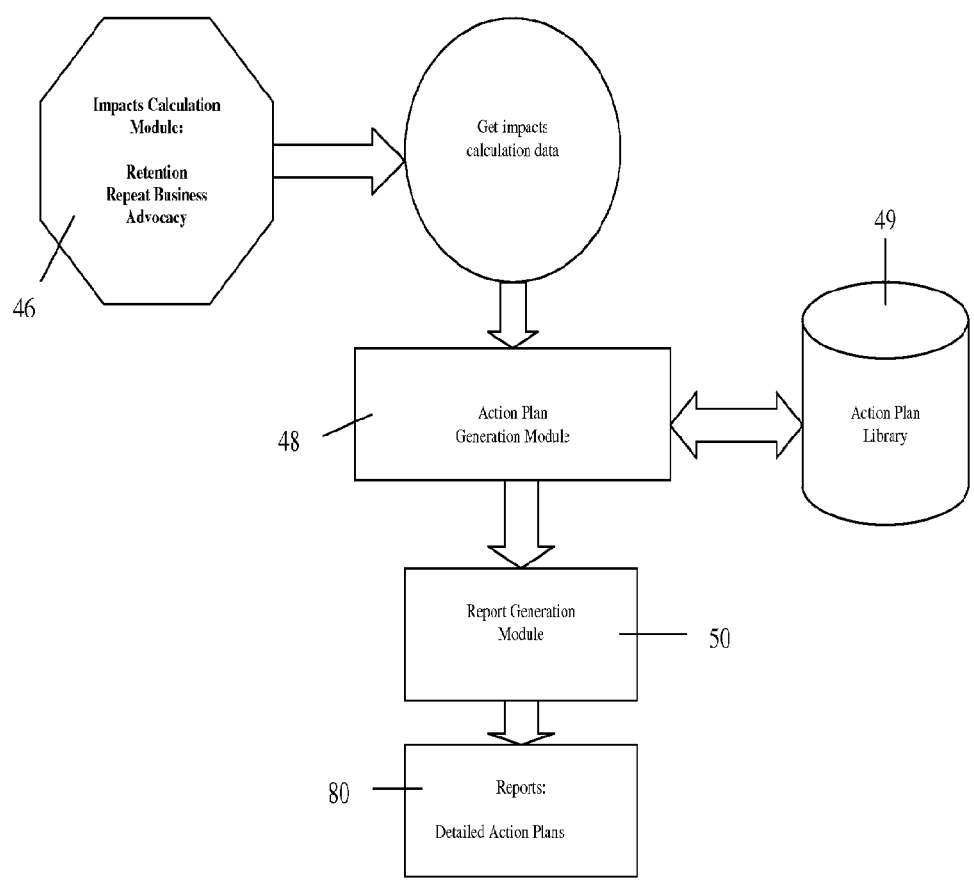
FIG. 8a is a software block diagram illustrating data flow and methods for the action plan generation software module.

FIG. 8a depicts the software implementation of the preferred embodiment for the action plan generation software module 48. The capacity to accurately calculate the impact of each latent variable on customers' behavioural intentions 20 such as retention, repeat business and advocacy, according to the prescribed stakeholder relationship causality model 52, and estimate resulting financial impacts is a key step in being able to influence and maximize future organizational performance 16. The action plans generated by the present invention arise from the calculations and insights derived from the impacts calculation module 46.

In the preferred embodiment, the action plan generation module 48 obtains the impact calculations 71, 72 and 73 from the impacts calculation module 46 to identify and rank the independent latent variables from highest to lowest impact for each customer behavioural intention 20 of retention, repeat business and advocacy. For each independent latent variable, the action plan generation module 48 compiles a detailed action plan 80 from templates contained in the linked action plan library 49, such action plans providing a comprehensive definition of the respective independent and dependent latent variables, the expected impact on the dependent variable by increasing/decreasing the independent variable by a single unit, and a commentary suggesting specific actions the organization could consider in order to achieve improved performance in the future. In the event of an appropriate existing action plan template not being available from the action plan library 49, a detailed action plan 80 is partially populated from available data and the remainder of the action plan manually authored by the user and stored in the action plan library 49 for future use. Compiled action plans are sent to the report generation module 50 from whence detailed action plans are produced and presented for user review and further development and tailoring if required. A copy of each action plan is stored in the action plan library 49 for future reference.

In the preferred embodiment, the detailed action plans 80 produced by the action plan generation module 48 may form the basis for even more detailed planning, design and approval processes within the organization at its discretion.

Figure 8B:
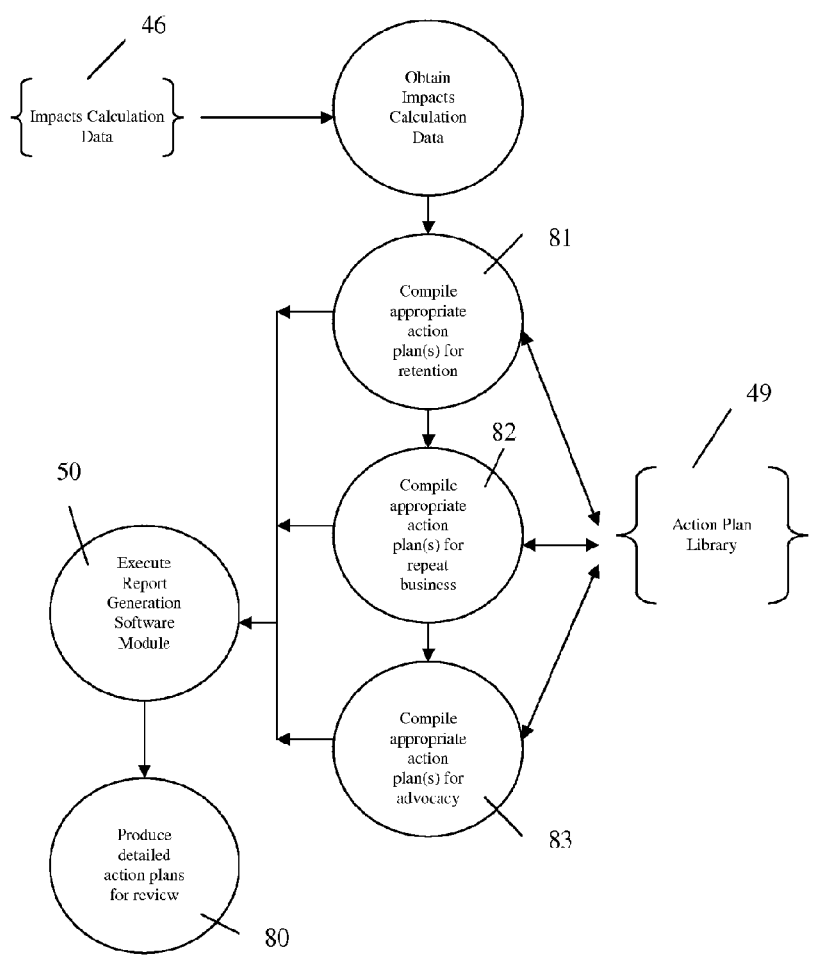
FIG. 8b is a process flowchart depicting the operations performed by the action plan generation software module.

FIG. 8b shows the processing steps for the action plan generation software module 48. The action plan generation module 48 obtains impacts calculation data from the impacts calculation module 46. The appropriate data are retrieved for the purpose of identifying impactful independent latent variables and compiling specific action plans for each of the behavioural intentions 20 of retention 81, repeat business 82 and advocacy 83 based on predefined action plan templates stored in the action plan library 49. Detailed action plans are produced via the report generation module 50 for the user to review.

Figure 9A:
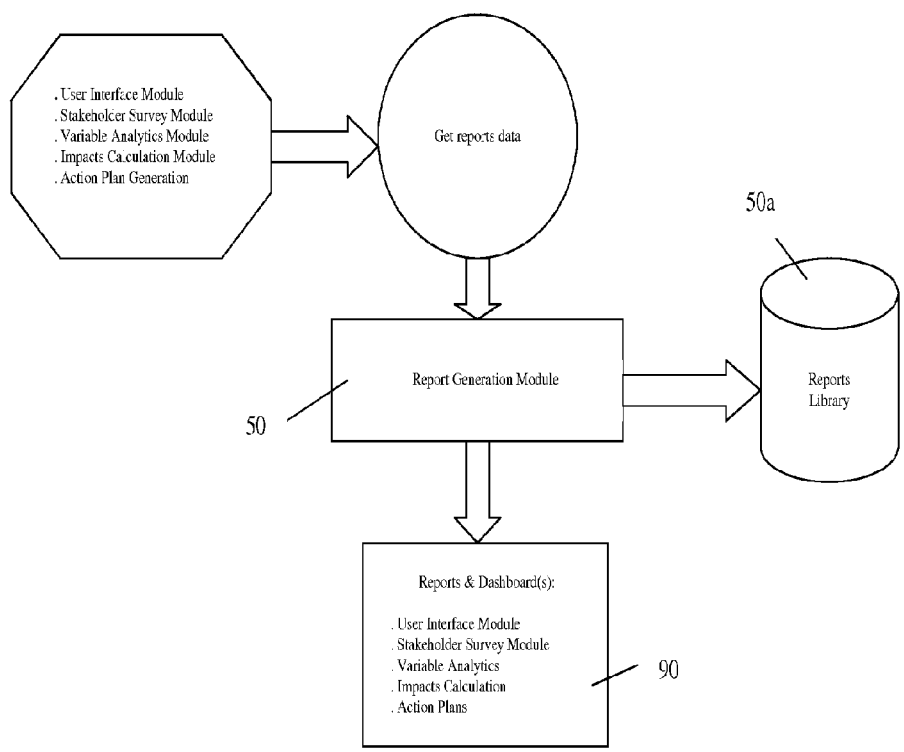
FIG. 9a is a software block diagram illustrating data flow and methods for the report generation software module.

FIG. 9a depicts the software implementation of the preferred embodiment for the report generation software module 50. The report generation module 50 obtains the reports data from the stakeholder survey 41, user interface 40, variable analytics 45, impacts calculation 46 and action plan generation 48 software modules to produce and distribute all reports and dashboards 90 to the user, with copies of all reports and dashboards stored in the reports library 50a.

Figure 9B:
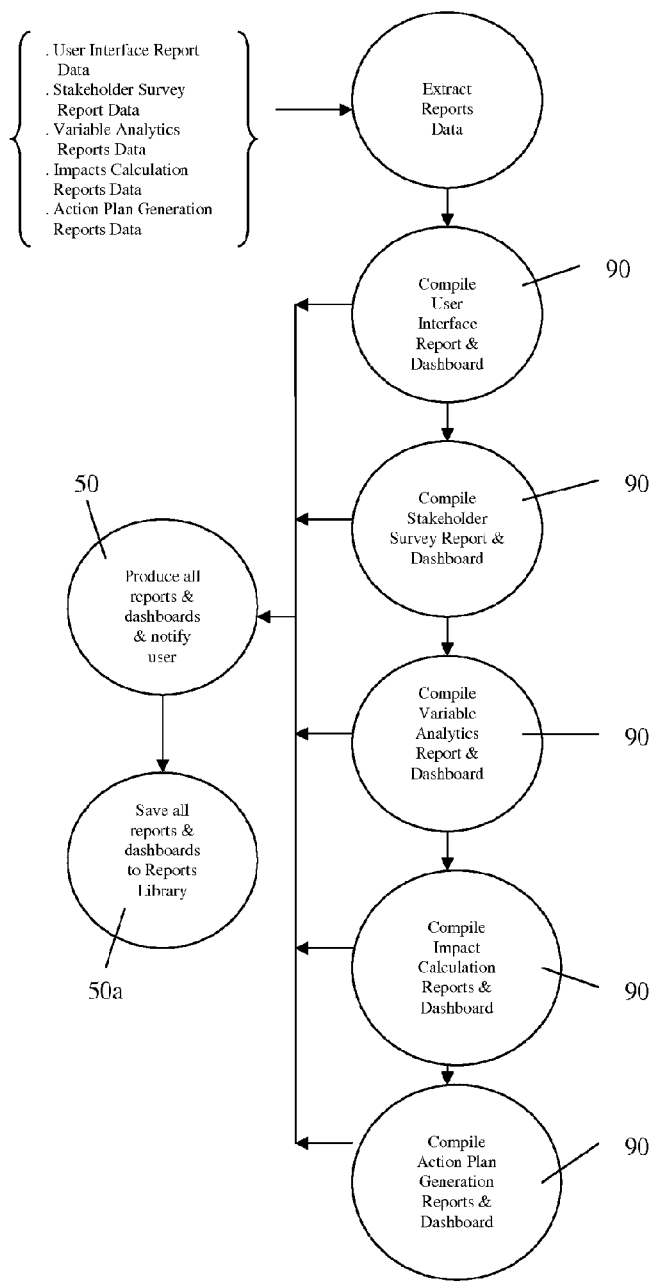
FIG. 9b is a process flowchart depicting the operations performed by the report generation software module.

FIG. 9b shows the processing steps for the report generation software module 50. The report generation module 50 retrieves reports data for the purpose of compiling reports and dashboards 90 representing the output associated with each of the stakeholder survey 41, user interface 40, variable analytics 45, impacts calculation 46 and action plan generation 48 software modules. All reports and dashboards are stored in the reports library 50a for future reference and use if required.

Figure 10:
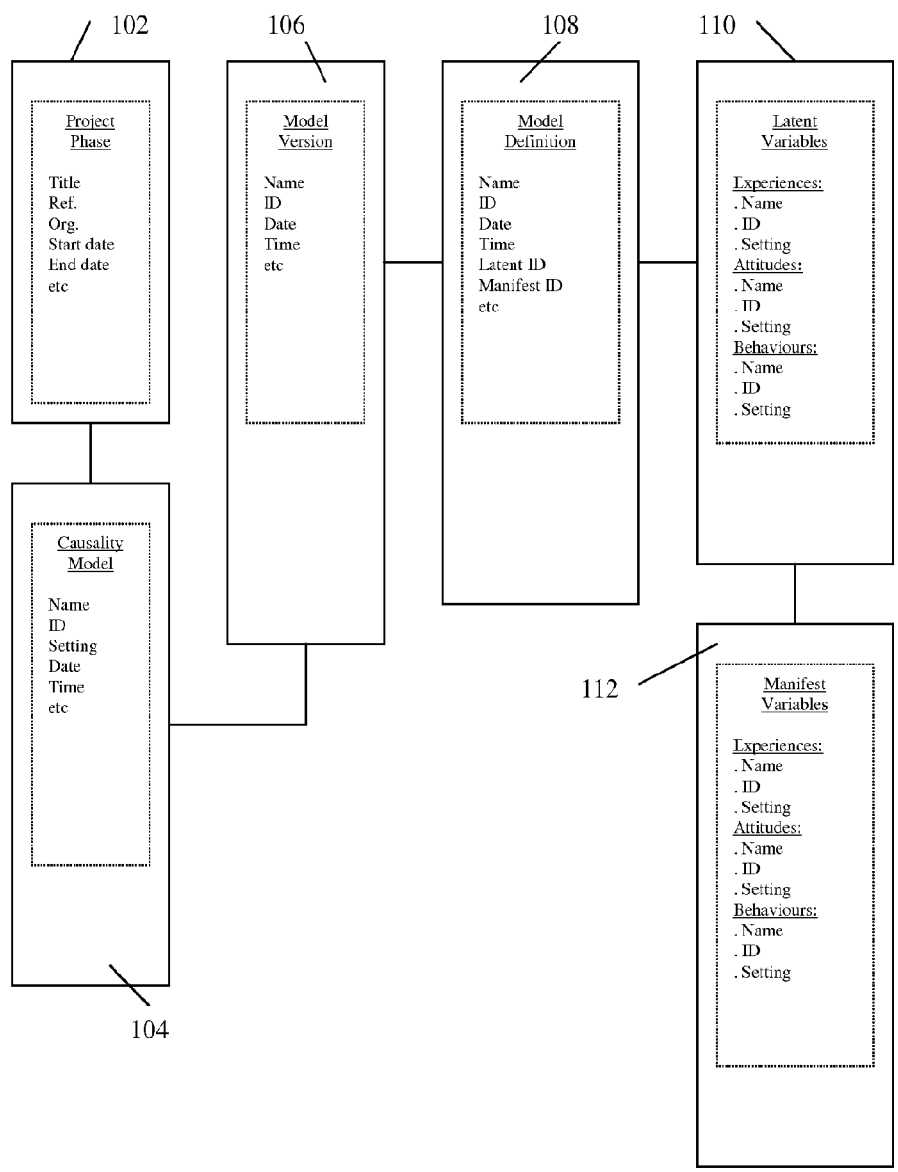
FIG. 10 is a diagram depicting the database schema utilized by the stakeholder model library within the present invention.

FIG. 10 depicts the database schema of the stakeholder model library 42 utilized in the preferred embodiment of the present invention. Those tables which are specifically used by the stakeholder survey software module 41 to construct each stakeholder relationship causality model 52 are depicted. Each use of the stakeholder survey software module 41 is regarded as a project. Therefore, the project phase table 102 provides information such as project title and reference number, organization identifier, start date and end date and other project related information. The project phase table 102 is linked to the causality model table 104.

The causality model table 104 contains such model related data as model name and identifier, a setting code that characterizes the relationship and industry setting (e.g. customers and retail banking), date and time established and other causality related information that enables the system user to select the most appropriate causality model 52 for a particular project. The causality model table 104 is linked to the model version table 106.

A causality model 52 can have multiple versions and the model version table 106 contains such version related model data as version name and identifier, date and time established and other model version related information that enables the system user to select the most appropriate causality model version for a particular project. The model version table 106 is linked to the model definition table 108.

The model definition table 108 contains such definition related model data as the definition name and identifier, date and time established, the identifiers for each manifest and latent variable associated with the specific model definition and other model definition related information that enables the system user to select the most appropriate causality model definition for a particular project. The model definition table 108 is linked to the latent variables table 110.

The latent variables table 110 contains such latent variable related data as the name, identifier and setting description for each latent variable associated with stakeholder experiences 12, attitudes 14 and behavioural intentions 20 that enables the system user to select the most appropriate latent variables for a particular project. The latent variables table 110 is linked to the manifest variables table 112.

The manifest variables table 112 contains such manifest variable related data as the name, identifier and setting description for each manifest variable associated with specific latent variables which are to be used to measure stakeholder experiences 12, attitudes 14 and behavioural intentions 20 and enables the system user to select the most appropriate manifest variables for a particular project.

Figure 11:
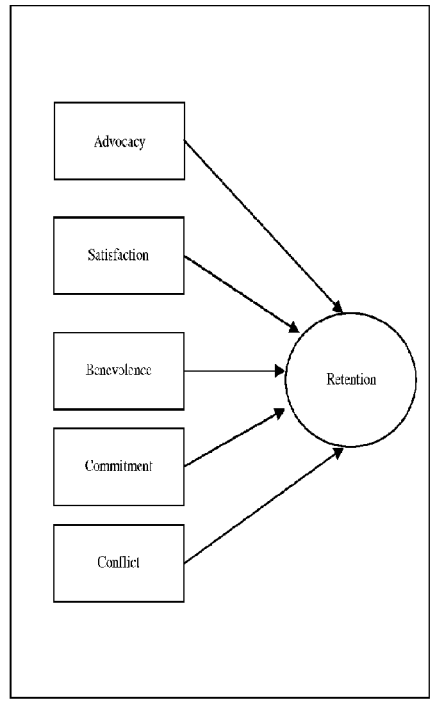
FIG. 11 depicts an example of a report illustrating the data results generated by the variable analytics software module.

FIG. 11 is an example of a report illustrating the data results generated by the variable analytics module 45 for a particular sub-model of a stakeholder relationship causality model 104. In this example is depicted the scores and other statistical measures associated with the latent variables defined by a particular version 106 (Moddef_0002, ModVers_003a) of a stakeholder relationship causality model 104 (RB_Mort001) involving a single dependent latent variable (retention) and a plurality of independent latent variables (advocacy, satisfaction, benevolence, commitment and conflict).

The statistical measures, as determined by the variable analytics module 45, are displayed and include the descriptive statistics depicting mean score, percentage score, standard deviation and sample size for each of the latent variables measured. Also displayed are the correlation statistics, model summary and coefficients from which standardized Beta scores 120 are extracted to rank the independent latent variables having the largest positive impact on the dependent latent variable. In this example is shown that advocacy has the largest positive impact on retention with a standardized Beta score of 0.513. In this example, the degree to which all the independent latent variables had in predicting the outcome of the dependent latent variable can be derived from the $R^2$ (correlation coefficient 130) value of 0.773 found in the model summary section.

Had results for the entire stakeholder relationship causality model been generated rather than a sub-model, as depicted by the version and definition identifiers, the report would also depict the scores and statistical measures for all latent variables included in the model and the 'Strength of Relationship Index' and 'Outcomes' scores.

FIG. 12 is an example of a system report illustrating the data results generated by the impacts calculation module 46 for a particular sub-model of a stakeholder relationship causality model 104. Using the data results generated by the variable analytics module 45 (see FIG. 11), the impacts calculation module 46 uses the data output to calculate the relative impact of each independent latent variable (advocacy, satisfaction, benevolence, commitment and conflict) on the single dependent latent variable (retention). When combined with other data extracted from the stakeholder profile database 47, in this example total number of customers, current annual customer retention rate, new customer acquisition cost, gross margin generated, gross margin growth each year, number of years each customer retained, discount rate and target annual customer retention rate, the impacts calculation module 46 predicts financial performance impacts such as customer life time value (CLTV) 140.

Standardized Beta scores 120 are reported for each of the independent latent variables together with measures of impact on the dependent latent variable if each of the Beta scores is independently increased by 1 unit. For instance, it is reported that if the Beta score for satisfaction increases by 1 unit, the impact on repeat business would be almost 31%. The example also provides output data concerning the calculation of customer life time value (CLTV) 140 under prevailing stakeholder relationship conditions (current CLTV 142) and under conditions reflecting specific changes in the performance scores of the independent latent variables associated with repeat business (predicted CLTV 144).

While the invention has been described in its presently preferred form, it will be appreciated by persons skilled in the art that numerous variations and/or modifications may be made to the invention as shown in the specific embodiments without departing from the spirit or scope of the invention as described and as set forth in the claims described below. The present embodiments are, therefore, to be considered in all respects as illustrative and not restrictive.

The invention claimed is:

1. A computer-implemented method for conducting a stakeholder relationship analysis for an organisation, wherein the method includes, in a processing system:
    selecting by a computer processing system a stakeholder model from a plurality of models stored in memory, the stakeholder model defining:
        a plurality of latent variables including:
        one or more experiential latent variables;
        one or more attitudinal latent variables; and
        one or more behavioural intention latent variables;
    recording by the computer processing system survey response data indicative of a plurality of responses to a survey conducted in relation to the organisation;
    identifying by the computer processing system, based upon the stakeholder model and the survey response data, one or more driver latent variables impacting upon the one or more behavioural intention latent variables;
    generating by the computer processing system, using the stakeholder model and the one or more driver latent variables, impact data indicative of a predicted impact upon the organisation due to one or more modifications to at least some of the one or more driver latent variables; and
    generating by the computer processing system, based on the impact data, a report indicative of one or more proposed modifications to the organisation associated with the one or more modified driver latent variables, to thereby improve the stakeholder relationship for the organisation.

2. The computer-implemented method according to claim 1, wherein the method includes, in the processing system, generating, using report template data stored in memory, the report, wherein the report template data includes a plurality of predefined organisation modifications for altering a plurality of driver latent variables for the stakeholder model.

3. The computer-implemented method according to claim 1, wherein the method includes, in the processing system, generating the survey according to the stakeholder model.

4. The computer-implemented method according to claim 1, wherein the stakeholder model defines:
    one or more positive experiential latent variables and attitudinal latent variables;
    one or more negative experiential latent variables and attitudinal latent variables;
    wherein the method includes, in the processing system:
    calculating, using the survey data, a first summed score of the one or more positive experiential latent variables and attitudinal latent variables;
    calculating, using the survey data, a second summed score of the one or more negative experiential latent variables and attitudinal latent variables;
    calculating a total experiential and attitudinal variable score by subtracting the second summed score from the first summed score, wherein the total experiential and attitudinal variable score is used to generate the impact data.

5. The computer-implemented method according to claim 1, wherein the stakeholder model defines:
    one or more positive behavioural intention latent variables;
    one or more negative behavioural intention latent variables;
    wherein the method includes, in the processing system:
    calculating, using the survey data, a first behavioural intention summed score of the one or more positive behavioural intention latent variables;
    calculating, using the survey data, a second behavioural intention summed score of the one or more negative behavioural intention latent variables;
    calculating a total behavioural intention variable score by subtracting the second behavioural intention summed score from the first behavioural intention summed score, wherein the total behavioural intention variable score is used to generate the impact data.

6. The computer-implemented method according to claim 1, wherein the method includes, in the processing system:
    obtaining organisation profile data indicative of a profile of the organisation; and
    using the organisation profile data to generate the impact data.

7. The computer-implemented method according to claim 1, wherein analysing the survey data includes:
    performing a correlation analysis to determine a strength and direction of one or more linear relationships between at least some of the latent variables; and
    performing a multiple regression analysis of the one or more linear relationships to identify the one or more driver latent variables.

8. A processing system for conducting a stakeholder relationship analysis for an organisation, the processing system comprising:
    a computer processing system; and
    a computer readable medium in communication with the computer processing system, wherein the computer readable medium when used by the computer processing system causes the computer processing system to:
    select a stakeholder model from a plurality of models stored in memory, the stakeholder model defining:
    a plurality of latent variables including:
    one or more experiential latent variables;
    one or more attitudinal latent variables; and
    one or more behavioural intention latent variables;
    record survey response data indicative of a plurality of responses to a survey conducted in relation to the organisation;
    identify, based upon the stakeholder model and the survey response data, one or more driver latent variables impacting upon the one or more behavioural intention latent variables;
    generate, using the stakeholder model and the one or more driver latent variables, impact data indicative of a predicted impact upon the organisation due to one or more modifications to at least some of the one or more driver latent variables; and
    generate, based on the impact data, a report indicative of one or more proposed modifications to the organisation associated with the one or more modified driver latent variables, to thereby improve the stakeholder relationship for the organisation.

9. The processing system according to claim 8, wherein the processing system is configured to generate, using report template data stored in memory, the report, wherein the report template data includes a plurality of predefined organisation modifications for altering a plurality of driver latent variables for the stakeholder model.

10. The processing system according to claim 8, wherein the processing system is configured to generate the survey according to the stakeholder model.

11. The processing system according to claim 8, wherein the stakeholder model defines:
   one or more positive experiential latent variables and attitudinal latent variables;
   one or more negative experiential latent variables and attitudinal latent variables;
   wherein the processing system is configured to:
   calculate, using the survey data, a first summed score of the one or more positive experiential latent variables and attitudinal latent variables;
   calculate, using the survey data, a second summed score of the one or more negative experiential latent variables and attitudinal latent variables;
   calculate a total experiential and attitudinal variable score by subtracting the second summed score from the first summed score, wherein the total experiential and attitudinal variable score is used to generate the impact data.

12. The processing system according to claim 8, wherein the stakeholder model defines:
   one or more positive behavioural intention latent variables;
   one or more negative behavioural intention latent variables;
   wherein the processing system is configured to:
   calculate, using the survey data, a first behavioural intention summed score of the one or more positive behavioural intention latent variables;
   calculate, using the survey data, a second behavioural intention summed score of the one or more negative behavioural intention latent variables;
   calculate a total behavioural intention variable score by subtracting the second behavioural intention summed score from the first behavioural intention summed score, wherein the total behavioural intention variable score is used to generate the impact data.

13. The processing system according to claim 8, wherein the processing system is configured to:
   obtain organisation profile data indicative of a profile of the organisation; and
   using the organisation profile data to generate the impact data.

14. The processing system according to claim 8, wherein the processing system is configured to analyse the survey data by:
   performing a correlation analysis to determine a strength and direction of one or more linear relationships between at least some of the latent variables; and
   performing a multiple regression analysis of the one or more linear relationships to identify the one or more driver latent variables.

15. A non-transitory computer readable medium including instructions executable by a processing system, wherein the processing system is configured, by the execution of computer readable medium to conduct a stakeholder relationship analysis for an organisation, wherein the processing system is configured to:
   select a stakeholder model from a plurality of models stored in memory, the stakeholder model defining:
   a plurality of latent variables including:
   one or more experiential latent variables;
   one or more attitudinal latent variables; and
   one or more behavioural intention latent variables;
   record survey response data indicative of a plurality of responses to a survey conducted in relation to the organisation;
   identify, based upon the stakeholder model and the survey response data, one or more driver latent variables impacting upon the one or more behavioural intention latent variables;
   generate, using the stakeholder model and the one or more driver latent variables, impact data indicative of a predicted impact upon the organisation due to one or more modifications to at least some of the one or more driver latent variables; and
   generate, based on the impact data, a report indicative of one or more proposed modifications to the organisation associated with the one or more modified driver latent variables, to thereby improve the stakeholder relationship for the organisation.

16. The computer readable medium according to claim 15, wherein the processing system is configured to generate, using report template data stored in memory, the report, wherein the report template data includes a plurality of predefined organisation modifications for altering a plurality of driver latent variables for the stakeholder model.

17. The computer readable medium according to claim 15, wherein the processing system is configured to generate the survey according to the stakeholder model.

18. The computer readable medium according to claim 15, wherein the stakeholder model defines:
   one or more positive experiential latent variables and attitudinal latent variables;
   one or more negative experiential latent variables and attitudinal latent variables;
   wherein the processing system is configured to:
   calculate, using the survey data, a first summed score of the one or more positive experiential latent variables and attitudinal latent variables;
   calculate, using the survey data, a second summed score of the one or more negative experiential latent variables and attitudinal latent variables;
   calculate a total experiential and attitudinal variable score by subtracting the second summed score from the first summed score, wherein the total experiential and attitudinal variable score is used to generate the impact data.

19. The computer readable medium according to claim 15, wherein the stakeholder model defines:
   one or more positive behavioural intention latent variables;
   one or more negative behavioural intention latent variables;
   wherein the processing system is configured to:
   calculate, using the survey data, a first behavioural intention summed score of the one or more positive behavioural intention latent variables;
   calculate, using the survey data, a second behavioural intention summed score of the one or more negative behavioural intention latent variables;
   calculate a total behavioural intention variable score by subtracting the second behavioural intention summed score from the first behavioural intention summed score, wherein the total behavioural intention variable score is used to generate the impact data.

20. The computer readable medium according to claim 15, wherein the processing system is configured to:
   obtain organisation profile data indicative of a profile of the organisation; and
   using the organisation profile data to generate the impact data.

21. The computer readable medium according to claim 15, wherein the processing system is configured to analyse the survey data by:

performing a correlation analysis to determine a strength and direction of one or more linear relationships between at least some of the latent variables; and performing a multiple regression analysis of the one or more linear relationships to identify the one or more driver latent variables.

\* \* \* \* \*